(12) United States Patent
Kirkham (10) Patent No.: US 12,248,449 B2
(45) Date of Patent: Mar. 11, 2025

(54) METHOD AND APPARATUS FOR STORING OBJECT TOKENS IN A DATABASE

(71) Applicant: Actian Corporation, Round Rock, TX (US)

(72) Inventor: Ian Philip Kirkham, Gloucestershire (GB)

(73) Assignee: Actian Corporation, Round Rock, TX (US)

(*) Notice: Subject to any disclaimer, the term of this patent is extended or adjusted under 35 U.S.C. 154(b) by 198 days.

(21) Appl. No.: 17/830,052

(22) Filed: Jun. 1, 2022

(65) Prior Publication Data

US 2022/0398235 A1 Dec. 15, 2022

Related U.S. Application Data

(60) Provisional application No. 63/209,790, filed on Jun. 11, 2021.

(51) Int. Cl.
G06F 16/22 (2019.01)
G06F 16/245 (2019.01)

(52) U.S. Cl.
CPC ........ *G06F 16/2219* (2019.01); *G06F 16/221* (2019.01); *G06F 16/245* (2019.01)

(58) Field of Classification Search
CPC ... G06F 16/221; G06F 16/2219; G06F 16/245
See application file for complete search history.

(56) References Cited

U.S. PATENT DOCUMENTS

| 5,974,416 A | 10/1999 | Anand et al. |
| 6,738,790 B1* | 5/2004 | Klein ............... G06F 16/30 |
| | | 707/999.203 |
| 8,805,651 B1* | 8/2014 | Bartlett ............... G06F 30/20 |
| | | 703/2 |
| 2002/0143521 A1 | 10/2002 | Call |
| 2003/0009431 A1* | 1/2003 | Souder ............... G06F 16/27 |
| 2004/0167879 A1* | 8/2004 | Cotner ............... G06F 16/2219 |
| 2005/0182800 A1 | 8/2005 | Ashwin et al. |
| 2005/0234986 A1* | 10/2005 | Terek ............... G06F 9/4493 |
| 2006/0047670 A1* | 3/2006 | Yu ............... G06F 16/2219 |
| 2008/0301148 A1* | 12/2008 | Lee ............... H04L 69/06 |
| 2012/0109910 A1 | 5/2012 | Netz et al. |
| 2013/0262875 A1* | 10/2013 | Garrard ............... G06F 16/21 |
| | | 707/654 |
| 2020/0387487 A1* | 12/2020 | Sherkat ............... G06F 16/2282 |
| 2021/0081421 A1* | 3/2021 | Liu ............... G06F 16/221 |

OTHER PUBLICATIONS

International Search Report and Written Opinion dated Nov. 4, 2022, issued by the International Searching Authority in related International Application No. PCT/US2022/033026.

* cited by examiner

*Primary Examiner* — James E Richardson
(74) *Attorney, Agent, or Firm* — ArentFox Schiff LLP (57) ABSTRACT

Examples described herein generally relate to database operations including encoding, within a length field for a first value to be stored in a column of a database as a token that includes information for processing a large object, an indicator indicating that the first value is of a token type, and storing, in the column of the database, the first value with the length field including the indicator.

28 Claims, 8 Drawing Sheets

METHOD AND APPARATUS FOR STORING OBJECT TOKENS IN A DATABASE

CLAIM OF PRIORITY UNDER 35 U.S.C. § 119

The present Application for Patent claims priority to Provisional Patent Application No. 63/209,790, entitled "METHOD AND APPARATUS FOR STORING OBJECT TOKENS IN A DATABASE" filed Jun. 11, 2021, which is assigned to the assignee hereof and hereby expressly incorporated by reference herein for all purposes.

TECHNICAL FIELD

The present disclosure relates to database systems, and particularly to database systems for storing object data outside of a line vector engine.

BACKGROUND

In conventional databases columns storing data of a particular type are often limited in width to a fixed size. Even variable length data columns usually have a fixed upper size limit based on the physical representation of the length field. For example, in some databases the maximum size for a column width is 32 kilobytes. While this size may be sufficient for many types of data, there is also a need to store larger data objects. For example, data such as images, videos, or models may easily surpass limit for a column width. Such data types may be referred to as large objects because such data is larger than the maximum width of the column.

One approach to storing large objects is to store a token in the database instead of the large object itself. The large object will be stored outside of the column, it may even be stored outside of the database, and can be accessed via the token. Generally, every row in the column for the large object columns will store a token. Such a system allows storage of the large objects but is inefficient in several ways. First, using a token to store a small value (e.g., a value smaller than the size of the token that represents it) may be inefficient in terms of both storage space and processing efficiency as extra steps are required to redeem the token. Second, the external storage may result in inefficient handling of queries. For example, the database or database management system may transfer the large objects from the external storage in order to perform a simple operation on the objects. Accordingly, the handling of data, particularly large objects or simply large volumes may be problematic when efficient query processing is needed.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, the disclosure provides a computer-implemented method of database operation. The method may include encoding, within a length field for a first value to be stored in a column of a database as a token that includes information for processing a large object, an indicator indicating that the first value is of a token type, and storing, in the column of the database, the first value with the length field including the indicator.

In another aspect, the disclosure provides a computer-implemented method of database operation. The method may include querying a database to obtain one or more values in a column of the database, decoding an indicator within a length field for a first value of the one or more values to determine that the first value is a token that includes information for processing a large object, and processing, based on determining that the first value is the token, the token to obtain the large object.

In other aspects, the disclosure provides a system for database operation including a memory configured to store instructions, one or more processors communicatively coupled with the memory. The one or more processors are configured to execute the instructions to cause the system to perform one or more operations of the methods described above and/or further herein. In additional aspects, a computer-readable medium including code executable by one or more processors for database operation is provided. The code includes code for performing one or more operations of the methods described above and/or further herein.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for indicating storing of tokens or in-line data in a column of a database. In an example, this can enable storing both small objects as in-line data and large objects as tokens to retrieve or generate the large objects in the same column of the database. The large objects may have a size that is larger than the column. The large objects may be stored in an external storage and associated with a token stored in the column of the database. The token may include information for processing the token. The large object may be processed by a vector processing engine at the remote storage in response to a database command on multiple records represented as a vector based on the information of the token. Accordingly, database commands may be applied to the large objects as if the large objects were regular sized values stored in the column. In an example, to distinguish small objects stored as in-line data from large objects stored to include a token, an indicator can be encoded into a field length value for the column-stored data to indicate whether the data is in-line data or a token.

In one example, a database system may include a set of cooperating vector processing engines, to improve processing of outsize data (e.g., large objects). Each of the vector processing engines can reside with a data lake or local pool of files and can include information regarding where the vector processing engine is located and how it is connected. These vector processing engines can serve the data on demand or execute requested operations on specific local data. Small objects or results can go back to the database for storage as in-line data, while large objects or results can be set aside or separately stored with a token substituted, e.g., and sent to the database, for storage and/or later redemption. In this example, the token can be passed to the database and/or stored instead of, or in place of, the data.

The vector processing engines can be vector processing database engines that can execute query instructions upon the data with which they reside. Each vector processing engine may hand off requests to further vector processing engines if so configured. In some implementations, the vector processing engines may lazily handle the data, for example, by sending small data or objects back to the requestor but keeping large data or object results at the vector processing engine, and instead passing a token to the requestor. The data can be redeemed as and when (or if) needed. Data that would have been unchanged by any operation may have a token referring to the base data; otherwise, freshly materialized or modified data may be cached for a time and the token made to refer to such data. Re-execution can retrieve that cached data as well if the cache item has not expired.

In some implementations, the vector processing engine may store the small object in-line data and large object tokens differently within the column of the database, and may store the data length encoded to indicate whether the data is small object in-line data or a large object token. In all cases the column's data can be represented with a prefix length followed by the data. The size of the data length may depend on the 'in-line size' being modeled in the database's catalog for the column. For practical use, in an example, these length fields can be regular within a column but could be 1, 2 or 4 byte integer fields to hold the length. In one example, the vector processing engine can encode, in the field length value for the data, an indication (e.g., a 1 bit indication) of whether the data is small object in-line data or a large object token. For example, small object in-line data can be stored with a field length value indicating the field length of the data (and/or a zero indicator bit), while a large object token can be stored with a specific field length value (and/or with the bit set) that indicates the data as being of a token type. In some implementations, the field length value for indicating token data may be zero or another specific field length value. In another example, the field length value for indicating token data may be a negative value. In one example, the negative value can represent the length of the token itself—e.g., the length can be the absolute value of the negative value or the negative value with the sign bit masked out.

In the above mentioned and below described examples, database processing is improved by allowing storage of small object in-line data values and large object tokens in the same column, along with indicators indicating whether the data is in-line data or a token. This storage can allow the vector processing engine or other database query processing engines to efficiently store or retrieve such data by encoding or decoding a related indicator in the field length value. Thus, when obtaining query results for the column, a large object need not be processed in full—rather the token can be retrieved and then subsequently used to obtain the full data if desired. In addition, small data objects can be stored directly in the column (in a different row of the same column) to avoid requiring token processing for the small data objects. Both of these advantages can improve operation of a computer by providing for more efficient database storage and query result processing.

Said differently, efficient data representation and handling that can represent a whole range of data sizes from very small (a few bytes) to the very large (multiple terabytes, etc.) is defined herein. This can be passed through existing database query engines without requiring significant re-engineering and fed into existing systems. This storage representation can be a desirable primitive data type on which to build other data type solutions, each of which would inherit the same benefits. Column data in databases usually needs to be of a limited size to maintain practical handling of the data through interfaces, query execution engines, caches and buffering schemes. Where this size limit is not adequate for certain data, columns can be represented as large objects (LOBs) of an appropriate datatype, such as character LOB (CLOB) or binary LOB (BLOB). The decision to opt for such a capability may have performance implications that precludes the simple use of such a data type as a general elastic sized solution.

Some approaches have defined a common arrangement of representing variable length data to encode the data with a prefix length of known or knowable size that then defines the active length of the following data. For small data, a single byte integer may suffice or two bytes for longer data and maybe four for much longer data, etc. This length might also be encoded in a manner like Unicode Transformation Format—8-bit (UTF-8) codepoint encoding to minimize space needed. Increasing the prefix length size might help but may require significant rework. Another approach may be to use existing support for LOB forms but this carries other overheads and limitations that may be unwarranted for most of the data. Other solutions may work well when all the data involved is of a similar small size such or very large and relatively infrequently accessed. Where data needs to model lengths of data from across the spectrum, the small data may fit in the LOB model inefficiently, and the large data may not fit in the small model.

Described herein are various aspects related to efficient representation of data elements whose size can vary considerably and whose physical location may be distributed. In an example, this can be directly relevant to moving or operating on potentially LOB data thorough database management systems (DBMSs) related software. In some examples, one simple length based representation scheme is provided that can allow outsized data to coexist in the same columns as smaller, traditionally represented and handled data. As processing of the data is performed, the small, traditionally structured data can be handled as before but the outsized data can be handled out-of-line as needed. A token scheme can be used for such data and the token redemption may be delayed until the data is finally needed, potentially passing through processing unchanged to a client, which could redeem the token out-of-line.

In particular, a hybrid arrangement offering the best of both extremes is provided, which may include exploiting the mechanism that describes the length of the data. For example, the length may be treated as an integer length, of whatever size or encoding as a two's complement signed value. For positive values, the length may determine the size of the variable object. Where a negative value is present, the absolute size can be interpreted as the length of a data token. The token can be for out-of-line data, which holds the information as to where the real data is located represented by this token and/or can be redeemed with this token. The token does not have to be just a file pointer. The token could, in some examples, be a sequence of operations that are to be applied to such a file; the operations in effect recording processing of the data further if access is eventually provided and the data redeemed and the operations applied. In this regard, for example, two forms of data, in-line and out-of-line tokens, can be present in rows of a given column at the same time.

Figure 1:
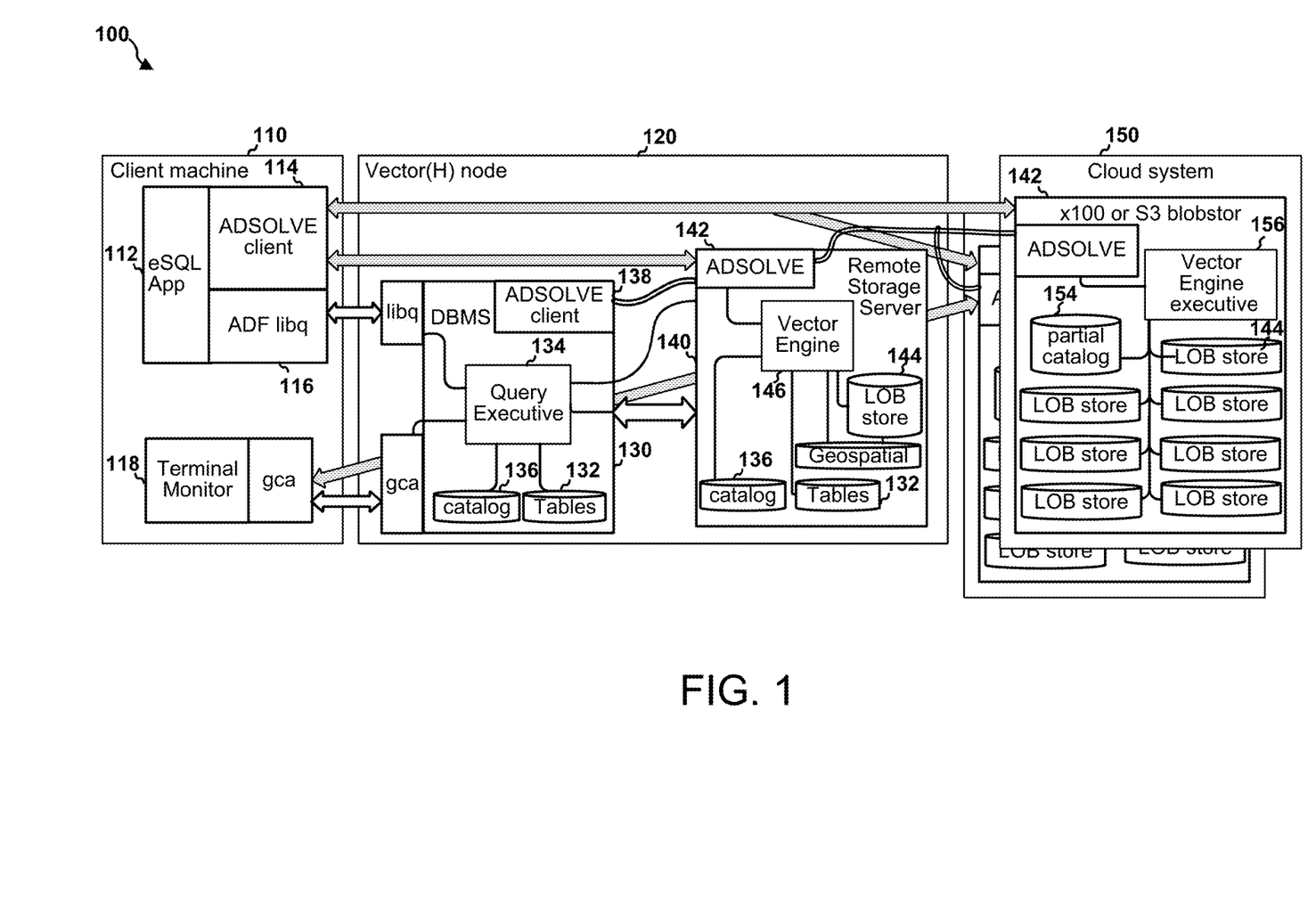
FIG. 1 is a diagram of an example computer system for providing large object storage in a database system, in accordance with an implementation of the present disclosure.

Referring now to FIG. 1, an example of a computer system 100 is shown that can provide for large object storage in a database system. The computer system 100 may include a client machine 110, a vector node 120 and a cloud system 150.

The client machine 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing communications related data. The client machine 110 may include a database application 112 such as an extended structured query language (eSQL). The database application 112 may, for example, generate database commands or queries based on user input. The database application 112 may include a vector engine client 114 that provides direct access to one or more vector engines operating at either the vector node 120 or the cloud system 150. In some implementations, the vector engines may be referred to as an abstract data stored out-of-line vector engine (ADSOLVE). The vector engine client 114 may allow the client machine 110 to redeem a token for a large object. The database application 112 may also include an interface 116 (e.g., a eSQL support client/server library that can embed a general communication architecture (GCA)) with a DBMS 130 that transmits database commands or queries to the DBMS 130. The client machine 110 may further include a terminal monitor 118 that connects to the DBMS 130 via an interface (e.g., GCA) to receive and display results.

The vector node 120 may include the DBMS 130. In some implementations, the vector node 120 may further include a remote storage server 140. The DBMS 130 may manage a database that may be stored in tables 132. A catalog 136 may describe the tables 132 of the database. The DBMS 130 may include a query executive 134 that processes database commands received from the client machine 110. The query executive 134 may manage the tables 132 and catalog 136. For example, the query executive 134 may perform database operations based on the received database commands. The tables 132 may be organized into rows and columns. As discussed in further detail below, the DBMS 130 may include a vector engine client 138 for performing database commands on multiple rows, some of which may include column values corresponding to large objects stored at the remote storage server 140 or the cloud service 150.

The remote storage server 140 may store database tables and/or large objects. The remote storage server 140 may include a vector engine 146. The vector engine 146 may perform vector processing on multiple rows of a database. In some implementations, the vector engine 146 may include hardware support for parallel operations.

The remote storage server 140 may include a vector engine interface 142. The vector engine interface 142 may receive database commands represented as a vector. For example, the database command may indicate one or more operations and a vector on which to perform the operations. The vector engine interface 142 may be configured to perform a set of supported operations including database commands and object-specific operations. A vector may represent a sequence of rows from a column, so the ordering of the vector can be important, e.g., both the external ordering of the sequence of vectors and the internal sequence in each vector. A vector may also be associated with a selection vector. The selection vector may be a bitvector indication of whether a vector element corresponding to a given table row is to be included or not. For example, a selection vector passed to the remote storage server 140 for processing of large objects may indicate which rows of the column store large objects.

The remote storage server 140 may include a LOB store 144. The LOB store 144 may store large objects that have a size greater than a threshold, such as greater than column size or maximum length of data that can be stored in the column of the table. The LOB store 144 may store the large objects as separate files or objects in a data lake. For example, the LOB store 144 may store large geospatial objects. For instance, a geospatial object may be a model of a building. In some cases, a geospatial object (e.g., a model of a storage shed) may be small enough to be stored in a column. Other geospatial objects (e.g., a model of a hospital or office building) may be much larger than a column, and as such, may be stored as large objects in LOB store 144.

A cloud system 150 may be a web service provided by a third party. The third party may provide computing services such as application hosting and data storage. The cloud system 150 may host a remote storage to support the DBMS 130. For instance the remote storage may include a vector engine interface 142, a vector engine executive 156, one or more LOB stores 144, and a partial catalog 154. From the perspective of the DBMS 130, the cloud system 150 may be hardware agnostic. For example, the cloud system 150 may provide a number of volume of LOB stores 144 accessible via a web address without providing details of the hardware storage devices. Similarly, the cloud system may host a vector engine executive 156 that virtualizes the vector engine 146. The vector engine executive 156 may not include hardware vector engine processing, but may provide similar performance on generic computing resources. The partial catalog 154 may include information about the structure of large data objects stored in the LOB store 144 and/or object specific operations for such large data objects.

As discussed above, the size of each column in a database (e.g., tables 132) may be limited. For example, the size of a column may be limited to 32 kilobytes (kB). The limited size of a column may present difficulties in storing, in a row of the column, objects that are larger than the column size.

In order to store large objects, the DBMS may utilize an extended tables (etab) system where the table stores a pointer to a large object in a remote system. The etab system may be, for example, a fixed width columns, row-store. For example, the large object may be stored in a LOB store 144 at the remote storage server 140, which may utilize a column-store which can store larger variable length data. While enabling storage of large objects, an etab system may have inefficiencies. For example, if some of the entries in the column are not large objects, the etab system may increase storage space. Additionally, retrieving objects via the etab system may increase traffic between the DBMS and the remote storage, for example, when the DBMS performs an operation on the column and all of the large objects are transferred between to the DBMS 130 and the remote storage server 140. Such costs may be higher when the remote storage is a cloud system 150.

In an aspect, the present disclosure provides for storage of both small object data and large object data in a column of a database table 132, along with an indicator to indicate whether data is small object in-line data or a large object token. The large objects may be associated with a token and the token may be used to redeem the large object as needed, instead of storing the actual data of the large object in the column. For example, the data stored in the column of the database table 132 may include a field length value that is encoded, at least in the case of a large object token, to indicate whether the data is of a token type (e.g., or whether the data is in-line data for a small object), as described further herein. The DBMS 130 may use the vector engine client 138 to communicate with the remote storage server 140 and/or the cloud system 150 via a vector engine interface 142. For example, the vector engine client 138 may request the remote storage server 140 to store one or more large objects. The vector engine interface 142 may determine whether to store the object at the remote storage server 140 or the cloud system 150. The vector engine interface 142 may provide an updated token with information about the location of the large object, which can be stored in the column for accessing the large object.

Figure 2:
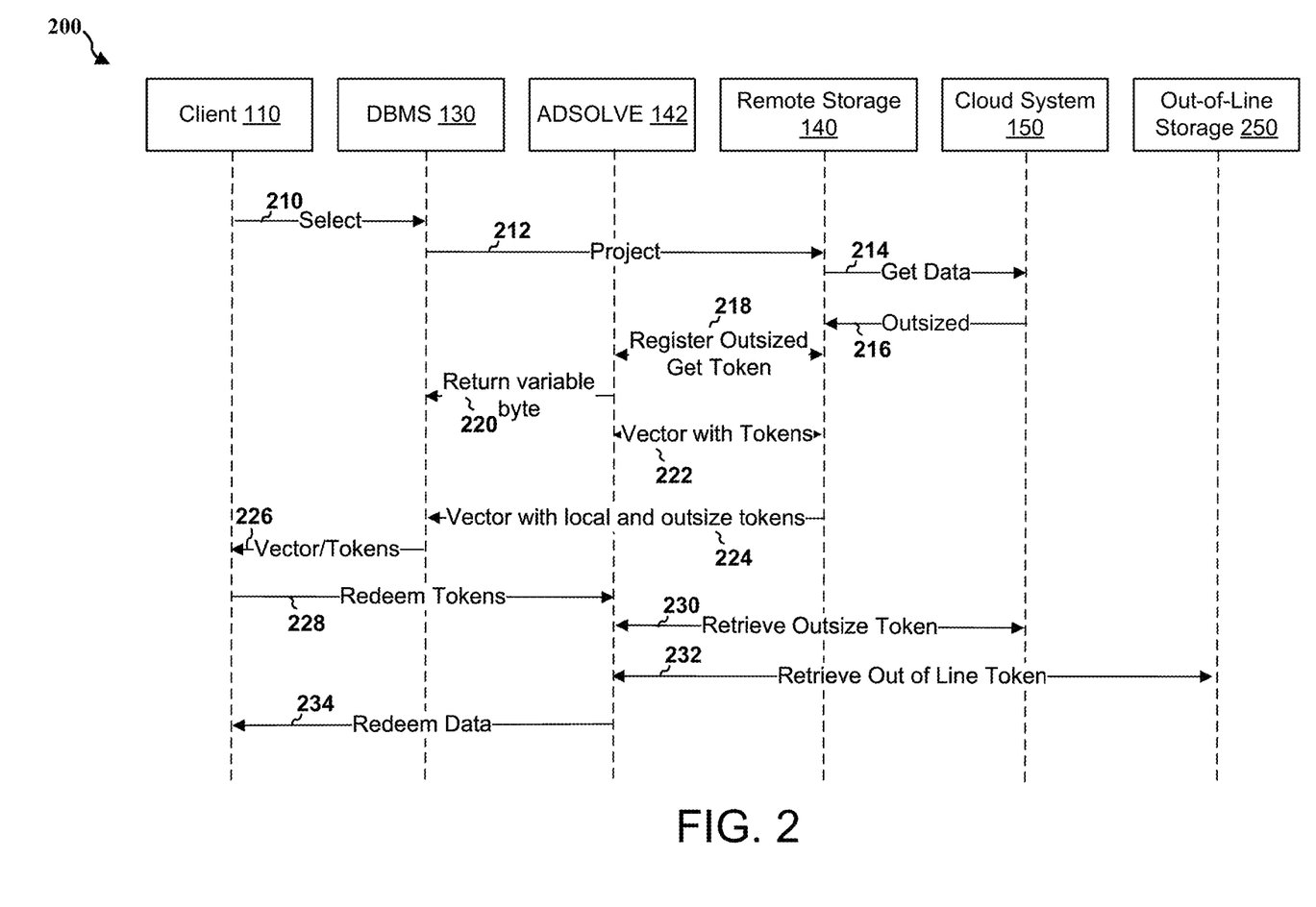
FIG. 2 is a message diagram illustrating communications among the components of the example computer system of FIG. 1, in accordance with an implementation of the present disclosure.

FIG. 2 is a message diagram 200 illustrating communications among the components of the system 100 for retrieving data according to an example use case. The client machine 110 may send a database command 210 to the DBMS 130 to request data. For example, the database command 210 may be a select command that identifies variable byte data that may be stored in the remote storage server 140. If the command requires remotely stored data, the DBMS 130 may project 212 the database command to the remote storage. The remote storage server 140 may determine that some of the data is stored in the cloud system 150 and issue a get data request 214. The cloud system 150 may return some columns of data and provide an outsized indication 216 that some of the requested data is outsized. The remote storage server 140 may register 218 the outsized data with the vector engine interface 142 and receive tokens. The vector engine interface 142 may return the available columns of data 220 to the DBMS 130. The vector engine interface 142 may fill a vector 222 with tokens for the outsized data for the remote storage server 140. The remote storage may return a vector 224 with local and outsized tokens to the DBMS 130. The DBMS 130 may provide the vector and tokens 226 to the client machine 110. The vector and tokens 226 may be filtered by the DBMS 130. The client machine 110 may redeem 228 the tokens from the vector engine interface 142. The vector engine interface 142 may retrieve tokens from the respective location. For example, the vector engine interface 142 may retrieve outsize data tokens 230 from the cloud system 150. The vector engine interface 142 may retrieve out-of-line tokens 232 (e.g., third party or URL) from an out-of-line storage 250. The vector engine interface 142 may provide the redeemed data 234 to the client machine 110.

Figure 3:
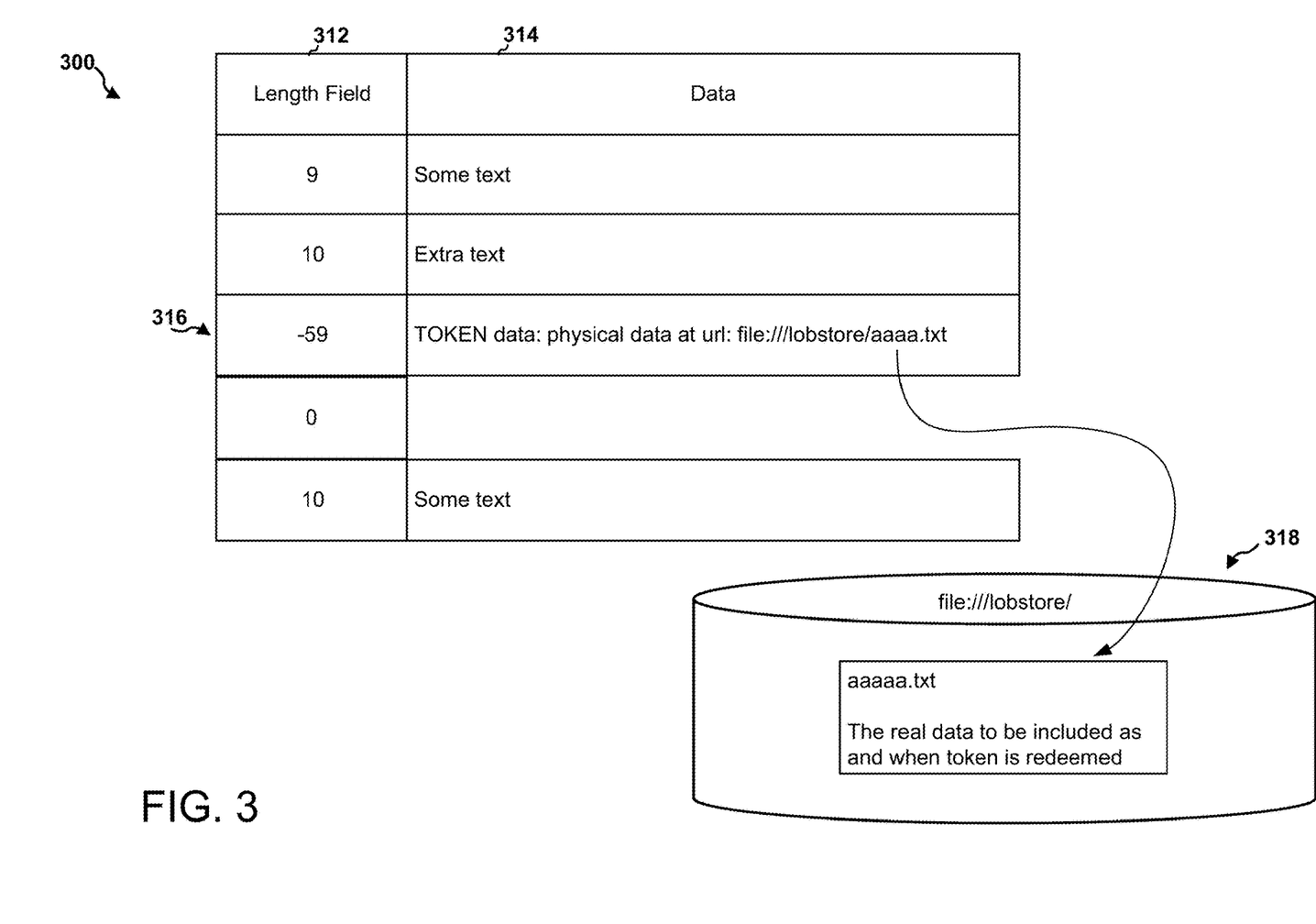
FIG. 3 is an example of a structure of a column including large object or small object data, in accordance with an implementation of the present disclosure.

FIG. 3 is an example of a structure 300 of a database (e.g., table(s) 132, or column values in the table(s) 132), which can include data representing both small values and large objects. For instance, the structure 300 may be a column stored in a table of the database, where the column can include multiple rows (or fields for each of multiple rows). For example, the database can include, for each row, additional columns of different data that are not shown for simplicity. Each value in the column 300 can include a length field 312 value and corresponding data 314. In one example, the length field 312 value may be a prefix for the data 314, and both the length field 312 and the data 314 can be stored together in the column (and the combination of the length field 312 and the data 314 can comply with the maximum length or size of the column). In another example, the length field 312 may be or may include a separate column in the database table.

In an example, the length field 312 value can be encoded to indicate when the corresponding data 314 is a large object token (and/or to indicate when the corresponding data 314 is small object in-line data). For example, where the data 314 is large object token, such as in field 316, the length field 312 value can be encoded as a negative value to indicate the data 314 as being of a token type. In addition, for example, the negative value of the length field 312 for field 316 can represent a length of the token in data 314 (e.g., such that an absolute value of the length field 312 can equal the length of the token). The remaining fields shown can have a length field 312 that represents the length of small object in-line data in data 314. Accordingly, for example, when data is retrieved from column 300, a vector database engine, database query processing engine, etc. can determine whether the data 314 is small object in-line data or large object token based on decoding the length field 312. In this example, a vector database engine, database query processing engine, etc. can determine that field 316 is of a token type based on the length field 312 having a negative value, and can determine a location (e.g., universal resource locator (URL)) for the data at "file:///lobstore/aaaaa.txt" which can point to a data store 318 at "file:///lobstore" having a file "aaaaa.txt" that includes the large object. The vector database engine, database query processing engine, etc. can retrieve or perform operations on the large object if desired.

Figure 4:
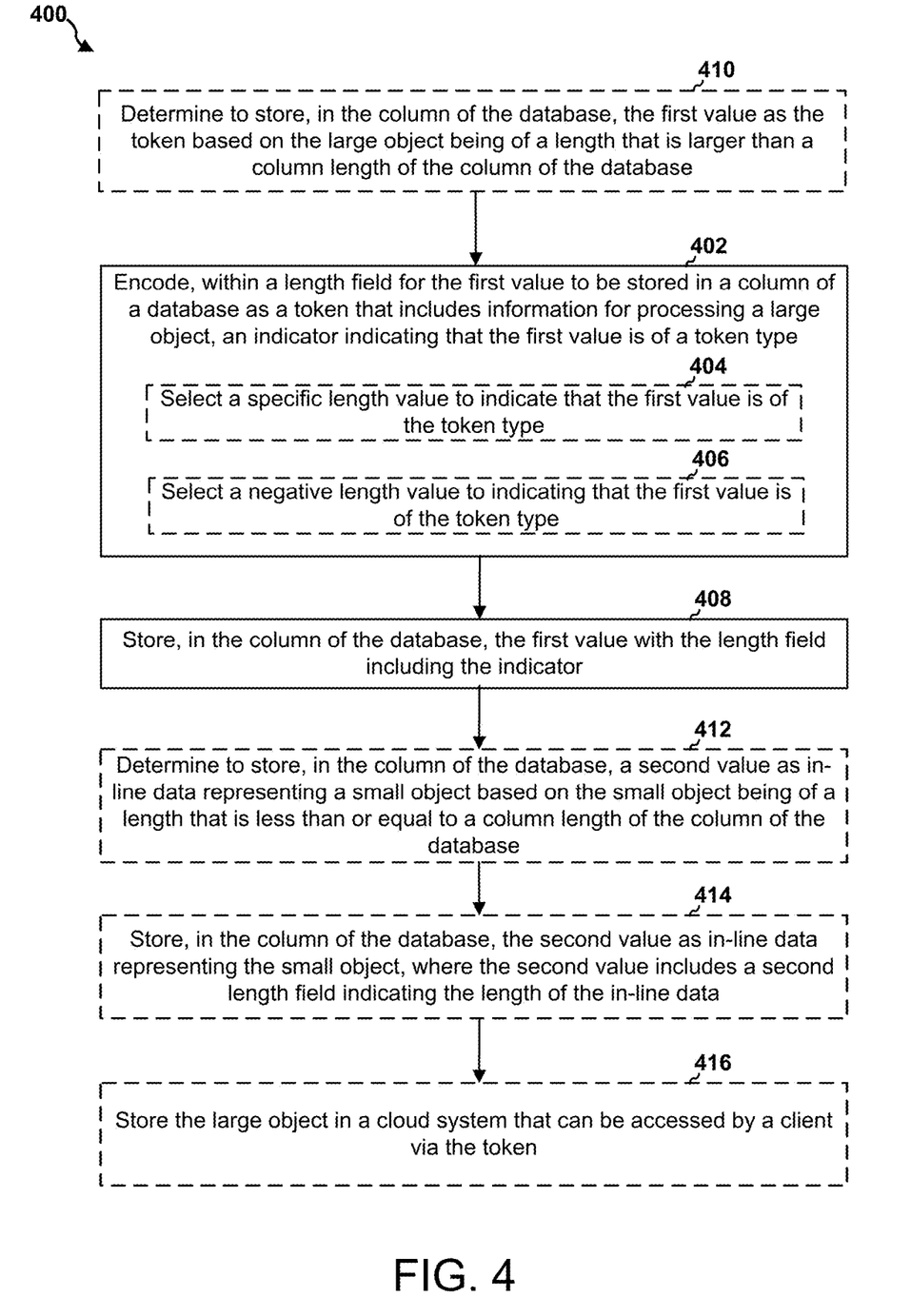
FIG. 4 is a flowchart of an example method of database operation for storing large object and/or small object data, in accordance with an implementation of the present disclosure.

FIG. 4 is a flowchart of an example of a method 400 of database operation to store large object and/or small object data. The method 400 may be performed by the DBMS 130, or a component thereof such as the query executive 134, which may be in communication with one or both of the remote storage server 140 and the cloud system 150.

At block 402, the method 400 may include encoding, within a length field for the first value to be stored in a column of a database as a token that includes information for processing a large object, an indicator indicating that the first value is of a token type. For example, the query executive 134, e.g., in conjunction with one or more processors, a memory storing instructions for executing on a processor and/or related data, etc., may encode, within a length field for the first value to be stored in a column of a database as a token that includes information for processing a large object, an indicator indicating that the first value is of a token type. For example, the length field may be a prefix to the data as stored in the column (e.g., as shown of length field 312 for data 314 in FIG. 3). In other examples, the length field may be a separate column or field in the database or corresponding table, etc.

In encoding the indicator within the length field at block 402, optionally at block 404, a specific length value can be selected to indicate that the first value is of the token type. For example, the query executive 134, e.g., in conjunction with one or more processors, a memory storing instructions for executing on a processor and/or related data, etc., may select the specific length value to indicate that the first value is of the token type. For example, the specific length value can be a length-agnostic length value that is the same regardless of the length of the token. For example, the specific length value can be zero or another value that can be the same to indicate that the data value is a token regardless of token length.

In another example, in encoding the indicator within the length field at block 402, optionally at block 406, a negative length value can be selected to indicate that the first value is of the token type. For example, the query executive 134, e.g., in conjunction with one or more processors, a memory storing instructions for executing on a processor and/or related data, etc., may select the negative length value to indicate that the first value is of the token type. In one example, query executive 134 can select the negative value to represent the field length of the token. For example, query executive 134 can select the negative value to be the negative of the positive value that is the field length (e.g., in bytes), or a two's complement value representation of the negative of the positive value.

In this example, the field length can be obtained as the absolute value of the negative value or by masking out a sign bit of the negative value, or as the absolute value of the two's complement value. For example, for a 3-bit value where the first bit is the sign bit, 001 can represent the value '1' and 101 can represent the value '−1' such that masking the sign bit or taking the absolute value can yield the value '1.' In another example, for two's complement, where the first bit is the sign bit, 001 can represent the value '1' and 111 can represent the value '−1' (where 101 represents the value '−3'), such that taking the absolute value can yield the value '1.' In an example, the length value can be indicated as a number of bytes (e.g., 1 byte, 2 byte, 4 byte, etc.), and the first bit (or most significant bit) can be used as the sign bit.

At block 408, the method 400 may include storing, in the column of the database, the first value with the length field including the indicator. For example, the query executive 134, e.g., in conjunction with one or more processors, a memory storing instructions for executing on a processor and/or related data, etc., may store, in the column of the database (e.g., in DBMS 130), the first value with the length field including the indicator. As described, for example, query executive 134 may store the length field as a prefix to the data stored in the column. In any case, for example, a database query processing engine, client, or other device can determine whether stored and retrieved data includes in-line data or a token to a large object based on the encoded length field, as described above and further herein.

Optionally, at block 410, the method 400 may include determining to store, in the column of the database, the first value as the token based on the large object being of a length that is larger than a column length of the column of the database. For example, the query executive 134, e.g., in conjunction with one or more processors, a memory storing instructions for executing on a processor and/or related data, etc., may determine to store, in the column of the database (e.g., in DBMS 130), the first value as the token based on the large object being of a length that is larger than a column length of the column of the database. In one example, the query executive 134 may receive a command to store the data in the database and/or in the column of the database, which may be part of a received database query (e.g., an insert command), and may specify the data to be stored. For example, the database query can be received from a client machine 110 or other node, database application 112, etc. In this example, the query executive 134 may determine the length or size of data to be stored in the column, and may accordingly determine to store the data as a large object based on its length or size, as described herein.

For example, for the first value and/or for any value to be stored in the column, the query executive 134 can compare a length of the object data to a threshold, such as to the column length of the column of the database. For example, where the length of the object data (or the length of the object data combined with a length of the length field) exceeds the threshold (e.g., exceeds the column length of the column of the database), the query executive 134 can determine to store the data as a large object, can set the first value as a token including information for processing the large object, and can encode the length field for the first value with the indicator to indicate that the first value is of a token type (e.g., as opposed to small object in-line data).

Optionally, at block 412, the method 400 may include determining to store, in the column of the database, a second value as in-line data representing a small object based on the small object being of a length that is less than or equal to a column length of the column of the database. For example, the query executive 134, e.g., in conjunction with one or more processors, a memory storing instructions for executing on a processor and/or related data, etc., may determine to store, in the column of the database, the second value as in-line data representing the small object based on the small object being of the length that is less than or equal to the column length of the column of the database (e.g., in DBMS 130). For example, for the second value and/or for any value to be stored in the column, the query executive 134 can compare a length of the object data to a threshold, such as to the column length of the column of the database. For example, where the length of the object data (or the length of the object data combined with a length of the length field) is less than or equal to the threshold (e.g., less than or equal to the column length of the column of the database), the query executive 134 can determine to store the data as in-line data representing the small object, and can set the length field for the second value to be the length of the second value. For example, the first value and second value may be stored in different rows of the column.

Optionally, at block 414, the method 400 may include storing, in the column of the database, the second value as in-line data representing the small object, where the second value includes a second length field indicating the length of the in-line data. For example, the query executive 134, e.g., in conjunction with one or more processors, a memory storing instructions for executing on a processor and/or related data, etc., may store, in the column of the database, the second value as in-line data representing the small object, where the second value includes a second length field indicating the length of the in-line data. For example, the query executive 134 can store the length field value and data (e.g., length field 312 value and data 314 shown in FIG. 3) in the column for subsequent retrieval. Storing small objects in-line and large objects as tokens allows for adaptive and efficient storing of the data, such that small objects can be retrieved without token processing and large objects can still be represented as tokens to prevent processing the large objects as part of the query itself (e.g., delaying processing of the large objects until requested after the query results are returned).

Optionally, at block 416, the method 400 may include storing the large object in a cloud system that can be accessed by a client via the token. For example, the query executive 134, e.g., in conjunction with one or more processors, a memory storing instructions for executing on a processor and/or related data, etc., may store the large object in a cloud system that can be accessed by a client via the token. For example, the query executive 134, or other component of the DBMS 130, may store the value as a large object in an external storage such as the remote storage server 140 or the cloud system 150. The query executive 134, or other component of the DBMS 130, may store the token associated with the large object in the column (e.g., geospatial data column) of the table 132. The token may include information for processing the large object, such as a length of the large object, location of the large object (e.g., a system, file, etc. where the large object is stored), credentials for accessing the large object and/or related system, file, etc., operators for performing operations on the large object, a cached value associated with the large object, etc. In any case, for example, the large object in the cloud system 150 can be accessed by a client (e.g., client machine 110 or associated database application 112, etc.) via the token.

Figure 5:
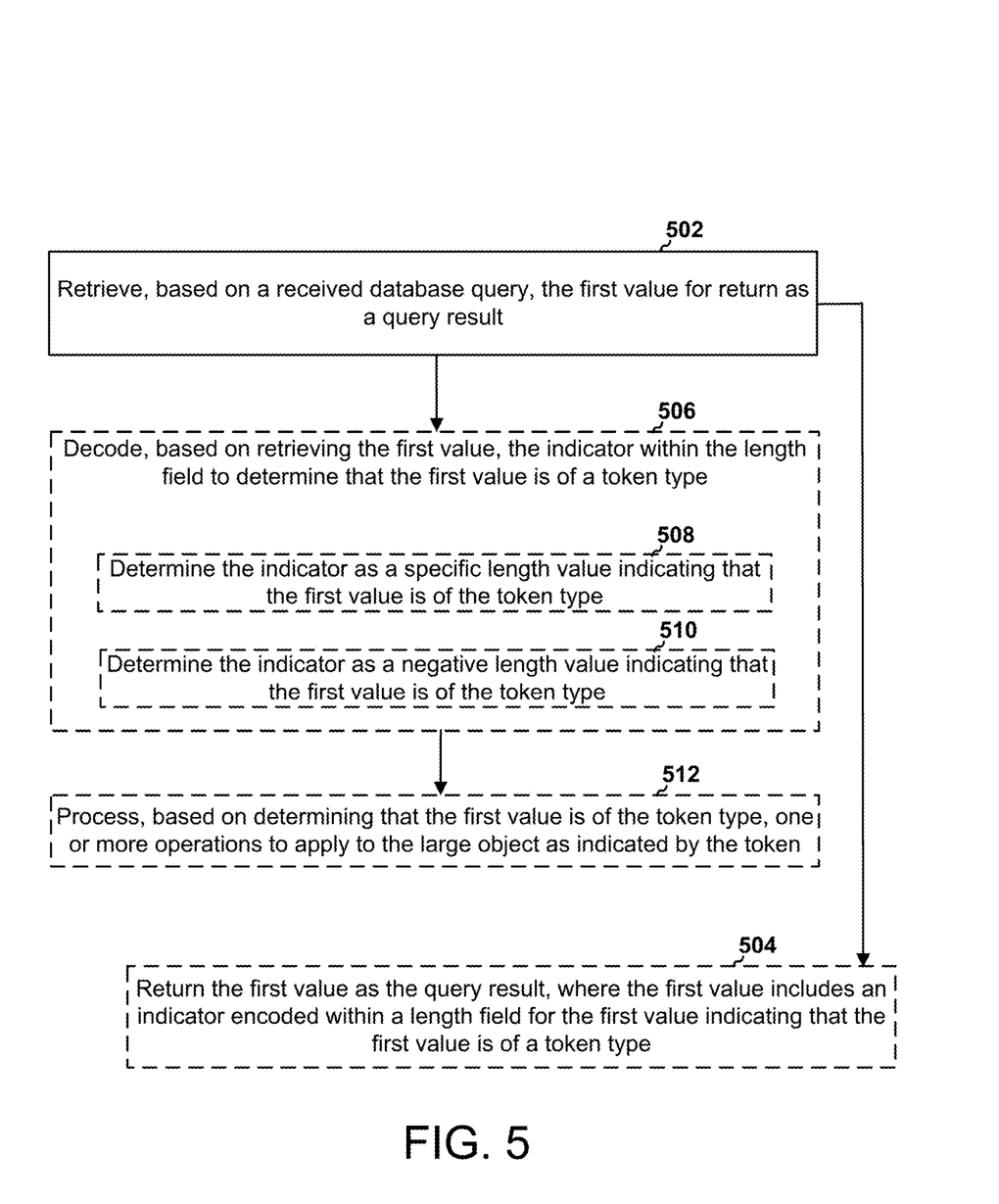
FIG. 5 is a flowchart of an example method of database operation for retrieving large object data for processing, in accordance with an implementation of the present disclosure.

FIG. 5 is a flowchart of an example of a method 500 of database operation to retrieve large object and/or small object data. The method 500 may be performed by the DBMS 130, or a component thereof such as the query executive 134, which may be in communication with one or both of the remote storage server 140 and the cloud system 150. In addition, in an example, method 500 may be performed for database columns stored using method 400 or a similar method to encode a length field to indicate whether data is in-line data or a token.

At block 502, the method 500 may include retrieving, based on a received database query, the first value for return as a query result. For example, the query executive 134, e.g., in conjunction with one or more processors, a memory storing instructions for executing on a processor and/or related data, etc., may retrieve, based on a received database query, the first value for return as a query result. For example, the query executive 134 may receive the database query from a client machine 110, where the database query may request retrieval of records from the database (e.g., in a select command) that satisfy a certain constraint, which may relate to a certain field of the records. The retrieved records can include the column data described herein that may be in-line data or a token, and in one example, the retrieved records can include the first value described above.

Optionally, at block 504, the method 500 may include returning the first value as the query result, where the first value includes an indicator encoded within a length field for the first value indicating that the first value is of a token type. For example, the query executive 134, e.g., in conjunction with one or more processors, a memory storing instructions for executing on a processor and/or related data, etc., may return the first value as the query result (e.g., in response to the received database query), where the first value includes an indicator encoded within a length field for the first value indicating that the first value is of a token type. In this regard, the node receiving the query result (e.g., client machine 110) can receive and process the query result, which can include determining that the first value is of the token type based on the encoded length field value of the first value.

Optionally, at block 506, the method 500 may include decoding, based on retrieving the first value, the indicator within the length field to determine that the first value is of a token type. For example, the query executive 134, e.g., in conjunction with one or more processors, a memory storing instructions for executing on a processor and/or related data, etc., may decode, based on retrieving the first value, the indicator within the length field to determine that the first value is of a token type. In this example, the query executive 134 can determine the first value is a token before providing the query results to another node (e.g., the client machine 110 or other node that requested the query). In this example, the query executive 134 can perform some processing of the large object token or related data instead of blindly passing the token to the requested node as a query result.

In decoding the indicator within the length field at block 506, optionally at block 508, the indicator can be determined as a specific length value indicating that the first value is of the token type. For example, the query executive 134, e.g., in conjunction with one or more processors, a memory storing instructions for executing on a processor and/or related data, etc., may determine the indicator as a specific length value indicating that the first value is of the token type. For example, the specific length value can be a length-agnostic length value that is the same regardless of the length of the token. For example, the specific length value can be zero or another value that can be the same to indicate any token regardless of token length.

In another example, in decoding the indicator within the length field at block 506, optionally at block 510, the indicator can be determined as a negative length value indicating that the first value is of the token type. For example, the query executive 134, e.g., in conjunction with one or more processors, a memory storing instructions for executing on a processor and/or related data, etc., may determine the indicator as a negative length value indicating that the first value is of the token type. In one example, query executive 134 can determine the negative value to represent the field length of the token. For example, query executive 134 can determine the negative value to be the negative of the positive value that is the field length (e.g., e.g., in bytes), such that the absolute value of the negative value, or the negative value with the sign bit masked out, or the absolute value of the two's complement value, yields the field length, and can process the token based on the determined length.

Optionally, at block 512, the method 500 may include processing, based on determining that the first value is of the token type, one or more operations to apply to the large object as indicated by the token. For example, the query executive 134, e.g., in conjunction with one or more processors, a memory storing instructions for executing on a processor and/or related data, etc., may process, based on determining that the first value is of the token type, one or more operations to apply to the large object as indicated by the token. For example, the query executive 134 can process operations indicated by the token before providing the token or corresponding large object data as a query result. For example, the one or more operations can relate to decrypting the token, where the token as stored in the column as the first value may be encrypted. For example, the one or more operations may allow for accessing encrypted UTF-32 data as UTF-8 (e.g., a cnv_utf32_to_utf8(decrypt(data)) function, or to get a case insensitive hash of UTF-8 data could be md5_utf8(lower_utf8(data)). In another example, the one or more operations can correspond to a push down operation to be performed on the data.

Figure 6:
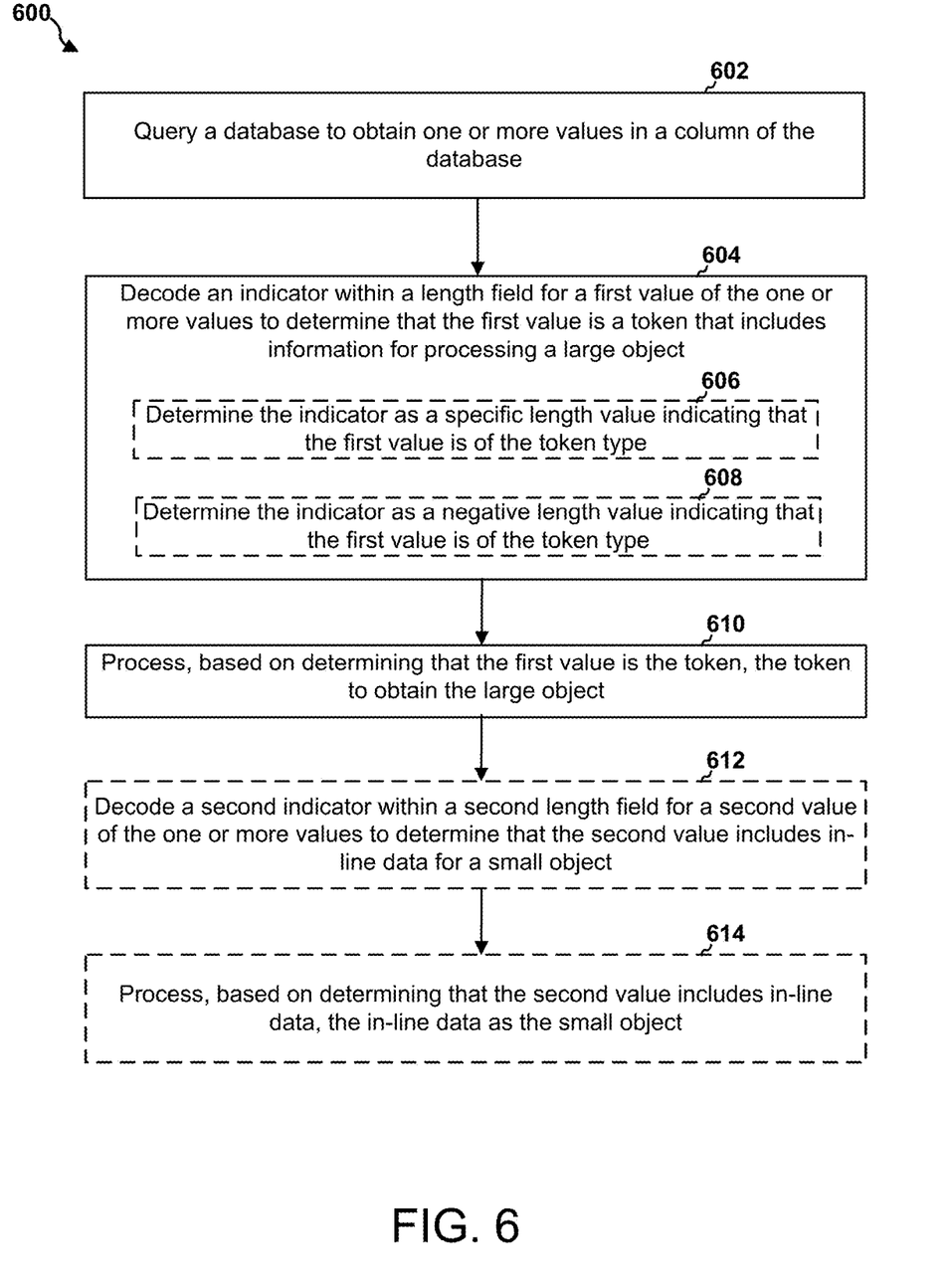
FIG. 6 is a flowchart of an example method of database operation for retrieving large object and/or small object data, in accordance with an implementation of the present disclosure.

FIG. 6 is a flowchart of an example of a method 600 of performing a query to obtain query results that may include large object and/or small object data. The method 600 may be performed by a client machine 110 or other node that can access the DBMS 130 to obtain query data therefrom, which may be stored in one or both of the remote storage server 140 and the cloud system 150. In one example, the client machine 110 or other node may access the DBMS 110 via cloud system 150. In addition, in an example, method 600 may be performed for database columns stored using method 400 or a similar method to encode a length field to indicate whether data is in-line data or a token.

At block 602, the method 600 may include querying a database to obtain one or more values in a column of the database. For example, the client machine 110 or other node, e.g., in conjunction with one or more processors, a memory storing instructions for executing on a processor and/or related data, etc., may query the database (e.g., DBMS 130) to obtain one or more values in a column of the database. For example, the query results may include column data that may possibly include values of in-line data (e.g., for small objects) or as a token to obtain the data (e.g., for large objects). In this example, as described, whether the data includes in-line data or a token may be indicated by an encoded length field.

At block 604, the method 600 may include decoding an indicator within a length field for a first value of the one or more values to determine that the first value is a token that includes information for processing a large object. For example, the client machine 110 or other node, e.g., in conjunction with one or more processors, a memory storing instructions for executing on a processor and/or related data, etc., may decode the indicator within the length field for the first value of the one or more values to determine that the first value is a token that includes information for processing the large object. In this example, the client machine 110 or other node can obtain the large object, if desired, or perform operations on the large object based on data within the token.

In decoding the indicator within the length field at block 604, optionally at block 606, the indicator can be determined as a specific length value indicating that the first value is of the token type. For example, the client machine 110 or other node, e.g., in conjunction with one or more processors, a memory storing instructions for executing on a processor and/or related data, etc., may determine the indicator as a specific length value indicating that the first value is of the token type. For example, the specific length value can be a length-agnostic length value that is the same regardless of the length of the token. For example, the specific length value can be zero or another value that can be the same to indicate any token regardless of token length.

In another example, in decoding the indicator within the length field at block 604, optionally at block 608, the indicator can be determined as a negative length value indicating that the first value is of the token type. For example, the client machine 110 or other node, e.g., in conjunction with one or more processors, a memory storing instructions for executing on a processor and/or related data, etc., may determine the indicator as a negative length value indicating that the first value is of the token type. In one example, the client machine 110 or other node can determine the negative value to represent the field length of the token. For example, the client machine 110 or other node can determine the negative value to be the negative of the positive value that is the field length (e.g., in bytes), such that the absolute value of the negative value, or the negative value with the sign bit masked out, yields the field length, or the absolute value of the two's complement value, and can process the token based on the determined length.

At block 610, the method 600 may include processing, based on determining that the first value is the token, the token to obtain the large object. For example, the client machine 110 or other node, e.g., in conjunction with one or more processors, a memory storing instructions for executing on a processor and/or related data, etc., may process, based on determining that the first value is the token, the token to obtain the large object. For example, the client machine 110 or other node can process the token to obtain the large object, perform one or more operations on the large object as indicated by the token or associated information, etc.

Optionally, at block 612, the method 600 may include decoding a second indicator within a second length field for a second value of the one or more values to determine that the second value includes in-line data for a small object. For example, the client machine 110 or other node, e.g., in conjunction with one or more processors, a memory storing instructions for executing on a processor and/or related data, etc., may decode the second indicator within the second length field for the second value of the one or more values to determine that the second value includes in-line data for the small object. In this example, the client machine 110 or other node can obtain the in-line data for the small object without requiring access to a different file or storage site, as used for large objects. In addition, for example, the client machine 110 or other node can determine that the second value is in-line data, and not a token, based on the length field being of a valid length value (e.g., a positive integer), as opposed to a value used to indicate token type data, as described above.

At block 614, the method 600 may include processing, based on determining that the second value includes in-line data, the in-line data as the small object. For example, the client machine 110 or other node, e.g., in conjunction with one or more processors, a memory storing instructions for executing on a processor and/or related data, etc., may process, based on determining that the second value includes in-line data, the in-line data as the small object. For example, the client machine 110 or other node can process the in-line data as is without requiring accessing a different file to storage site, as used for large objects.

Figure 7:
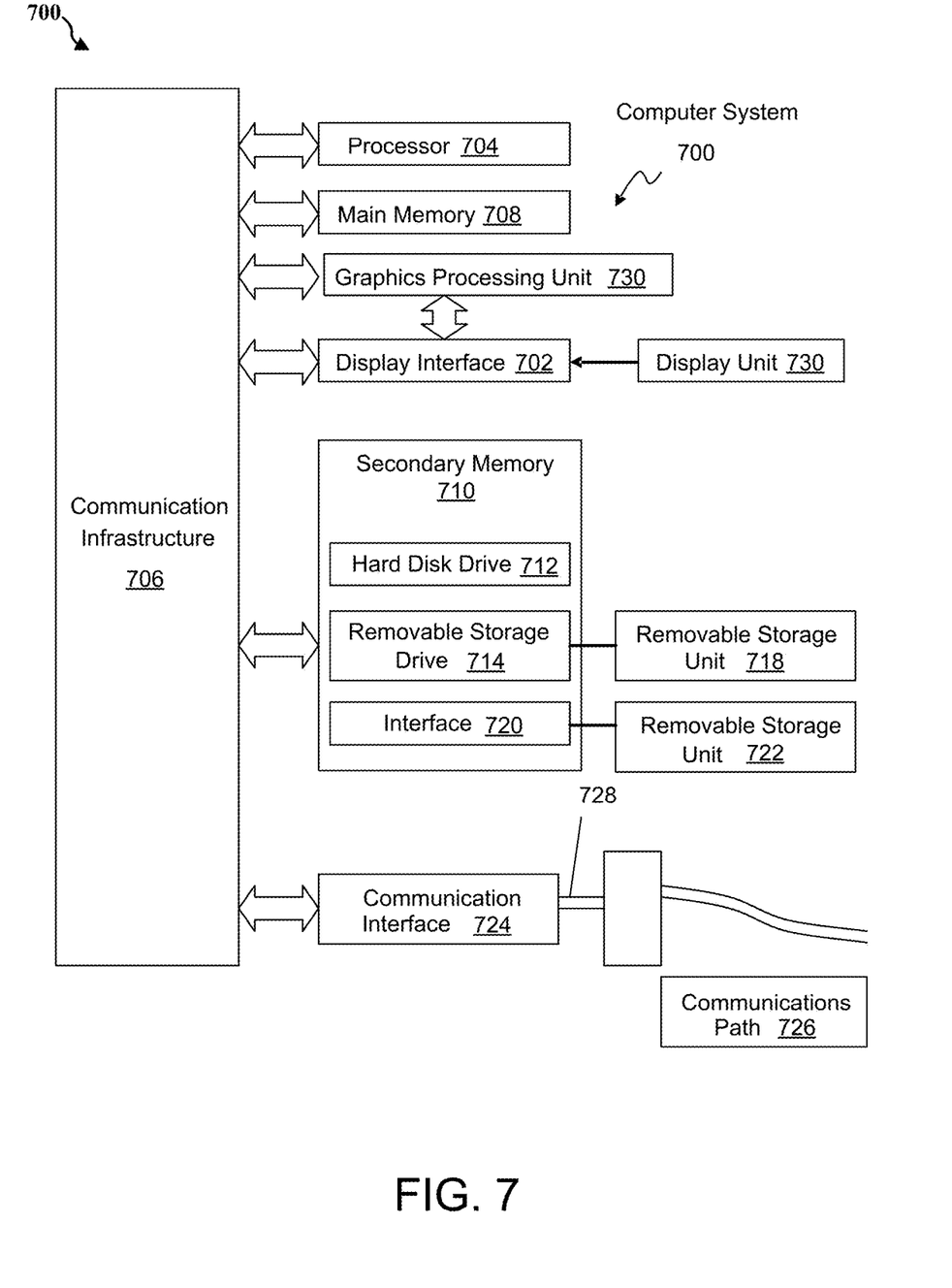
FIG. 7 presents an example of a system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include nonvolatile memory, for example, a hard disk drive 712, flash memory and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a USB memory drive, SD card, floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724.

Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard disk drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 8:
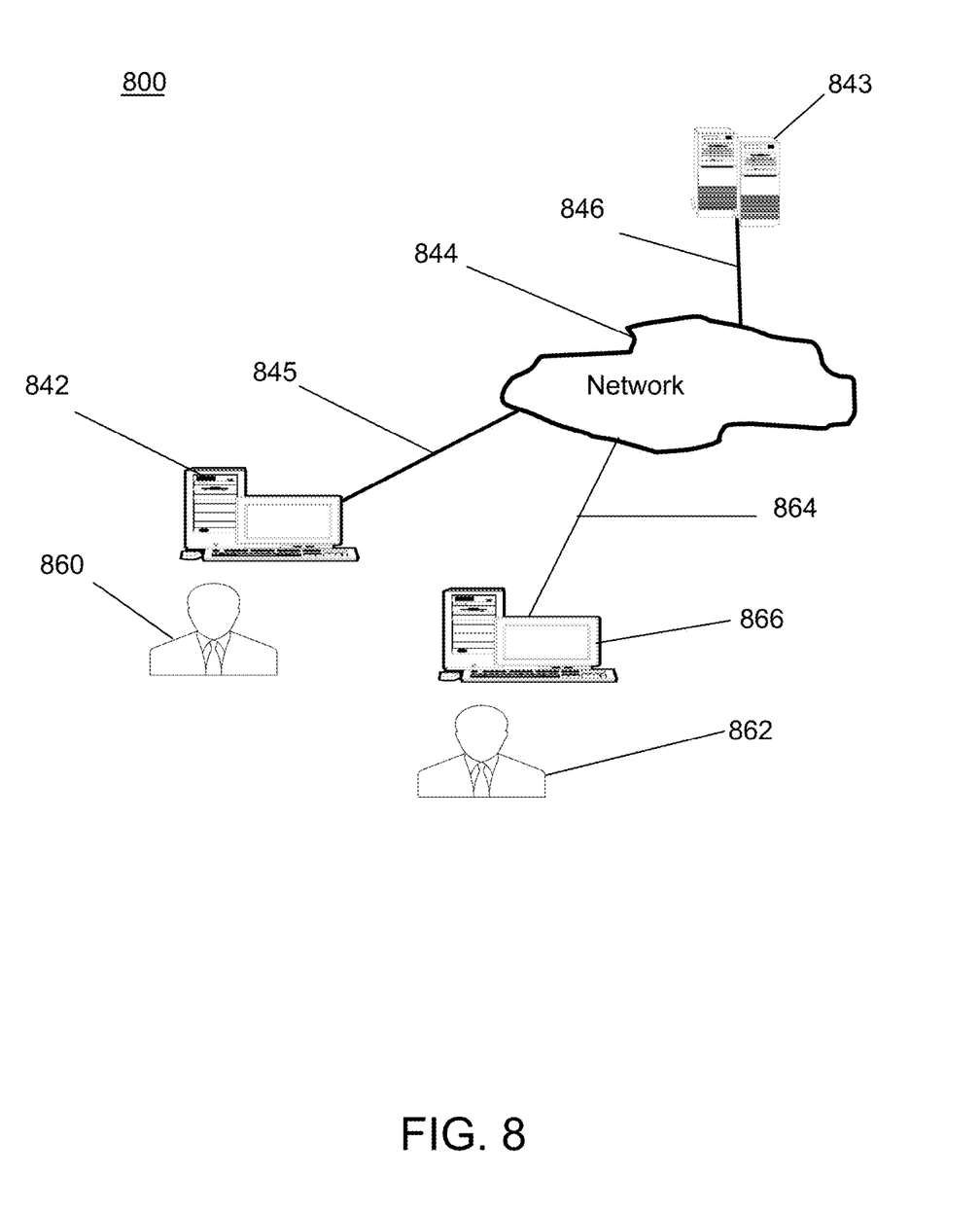
FIG. 8 is a block diagram of various examples of system components, for use in accordance with aspects of the present disclosure.

FIG. 8 is a block diagram of various example system components (e.g., on a network) that may be used in accordance with aspects of the present disclosure. The system 800 may include one or more accessors 860, 862 (also referred to interchangeably herein as one or more "users") and one or more terminals 842, 866. In one aspect, data for use in accordance with aspects of the present disclosure may, for example, be input and/or accessed by accessors 860, 862 via terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber optic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the aspects disclosed herein may be implemented or performed with a specially-programmed one of a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example of a storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. Computer-readable media includes may be referred to as non-transitory computer-readable media. Non-transitory computer-readable media may exclude transitory signals. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

This written description uses examples to disclose aspects of the present disclosure, including the preferred variations, and also to enable any person skilled in the art to practice the aspects thereof, including making and using any devices or systems and performing any incorporated methods. The patentable scope of these aspects is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various variations described, as well as other known equivalents for each such aspect, can be mixed and matched by one of ordinary skill in the art to construct additional variations and techniques in accordance with principles of this application.

What is claimed is:

1. A computer-implemented method of database operation, comprising:
    setting a sign bit of a length field for a first value to be represented in a database to indicate that the first value is of a token type that includes information for processing a large object;
    storing, in a database, the first value as the token type along with the length field including the sign bit;
    querying the database resulting in obtaining the first value as a query result; and
    processing, based on a sign bit of a length field of the first value, the first value as a token to obtain the large object using the token including determining a network location to perform the processing based on an amount of network traffic for an operation determined according to information of the first value, a network topology, and a structure of the large object.

2. The computer-implemented method of claim 1, further comprising determining to store the first value as the token type based on the large object being of a length that is larger than a threshold length associated with the database.

3. The computer-implemented method of claim 1, wherein setting the sign bit includes selecting a negative length value for the length field to indicate that the first value is of the token type.

4. The computer-implemented method of claim 3, wherein a portion of the length field not including the sign bit indicates a length of the first value.

5. The computer-implemented method of claim 3, wherein the negative length value is a two's complement representation of a negative value of a length of the first value.

6. The computer-implemented method of claim 1, further comprising storing a second value as in-line data representing a small object, wherein the second value includes a second value length field indicating a length of the in-line data.

7. The computer-implemented method of claim 6, further comprising determining to store the second value as in-line data representing the small object based on the small object being of a length that is less than or equal to a threshold length associated with the database.

8. The computer-implemented method of claim 1, further comprising:
decoding, based on obtaining the first value, the sign bit to determine that the first value is of the token type.

9. The computer-implemented method of claim 1, further comprising storing the large object in a cloud system that can be accessed by a client via the first value.

10. The computer-implemented method of claim 1, wherein the first value includes a cached value of a previously performed operation for the large object.

11. A computer-implemented method of database operation, comprising:
querying a database to obtain one or more values associated with the database; and
processing, based on a sign bit of a length field of a first value of the one or more values, the first value as a token to obtain a large object using the token including determining a network location to perform the processing based on an amount of network traffic for an operation determined according to information of the first value, a network topology, and a structure of the large object.

12. The computer-implemented method of claim 11, wherein the sign bit indicates the length field as a negative length value.

13. The computer-implemented method of claim 12, further comprising determining a length of the first value based on the negative length value.

14. The computer-implemented method of claim 13, wherein determining the length of the first value includes determining an absolute value of a two's complement value represented by the negative length value.

15. The computer-implemented method of claim 11, further comprising:
processing, based on a second sign bit of a second length field of a second value of the one or more values, the second value as in-line data for a small object.

16. The computer-implemented method of claim 11, further comprising, where the first value indicates one or more operations to apply on the large object, applying the one or more operations on the large object.

17. A system for database operation, comprising:
a memory configured to store instructions; and
one or more processors communicatively coupled with the memory, wherein the one or more processors are configured to:
set, a sign bit of a length field for a first value to be represented in a database to indicate that the first value is of a token type that includes information for processing a large object;
store, in the memory the first value as the token type along with the length field including the sign bit;
query the database resulting in obtaining the first value as a query result; and
process, based on a sign bit of a length field of the first value, the first value as a token to obtain the large object using the token including determining a network location to perform the processing based on an amount of network traffic for an operation determined according to information of the first value, a network topology, and a structure of the large object.

18. The system of claim 17, wherein the one or more processors are further configured to store the first value as the token type based on the large object being of a length that is larger than a threshold length associated with the database.

19. The system of claim 17, wherein the one or more processors are configured to set the sign bit at least in part by selecting a negative length value for the length field to indicate that the first value is of the token type.

20. The system of claim 17, wherein the one or more processors are further configured to store a second value as in-line data representing a small object based on the small object being of a length that is less than or equal to a threshold length associated with the database, wherein the second value includes a second value length field indicating a length of the in-line data.

21. The system of claim 17, wherein the one or more processors are further configured to:
decode, based on obtaining the first value, the sign bit to determine that the first value is of the token type.

22. The system of claim 17, wherein the one or more processors are configured to store the large object in a cloud system that can be accessed by a client via the first value.

23. The system of claim 17, wherein the first value includes a cached value of a previously performed operation for the large object.

24. A system for database operation, comprising:
a memory configured to store instructions; and
one or more processors communicatively coupled with the memory, wherein the one or more processors are configured to:
query a database to obtain one or more values associated with the database; and
process, based on a sign bit of a length field of a first value of the one or more values, the first value as a token to obtain a large object using the token including determining a network location to perform the processing based on an amount of network traffic for an operation determined according to information of the first value, a network topology, and a structure of the large object.

25. The system of claim 24, wherein the sign bit indicates the length field as a negative length value.

26. The system of claim 25, wherein the one or more processors are configured to determine a length of the first value based on the negative length value.

27. The system of claim 24, wherein the one or more processors are further configured to:
process, based on a second sign bit of a second length field of a second value of the one or more values, the second value as in-line data for a small object.

28. The system of claim 24, wherein the one or more processors are configured to, where the first value indicates one or more operations to apply on the large object, apply the one or more operations on the large object.

* * * * *